United States Patent

[11] 3,567,962

[72] Inventor Ferdinando Formenti
Milan, Italy

[21] Appl. No. 742,837
[22] Filed July 5, 1968
[45] Patented Mar. 2, 1971
[73] Assignee Societa Italiana Telecomunicazioni Siemens S.p.A.
Milan, Italy
[32] Priority July 6, 1967
[33] Italy
[31] 18,051A/67

[54] GATING NETWORK FOR TIME-SHARING COMMUNICATION SYSTEM
10 Claims, 2 Drawing Figs.

[52] U.S. Cl. .......... 307/246, 307/249, 307/254
[51] Int. Cl. .......... H03k 17/00
[50] Field of Search .......... 307/246, 249, 250, 254, 255

[56] References Cited
UNITED STATES PATENTS

| | | | |
|---|---|---|---|
| 2,970,227 | 1/1961 | Horton et al. | 307/254X |
| 3,253,161 | 5/1966 | Owen | 307/246 |

*Primary Examiner*—Donald D. Forrer
*Assistant Examiner*—B. P. Davis
*Attorney*—Karl F. Ross

ABSTRACT: A signal patch including two transistors connected back-to-back is closed by the discharge of a condenser through a biasing resistance which is connected in parallel across the bases and the emitters of these transistors, preferably in series with a diode, the condenser having a charging circuit which is closed during a blocking period and which is open during an unblocking period during which a normally open discharge circuit through the biasing resistance is closed.

Figure 1:
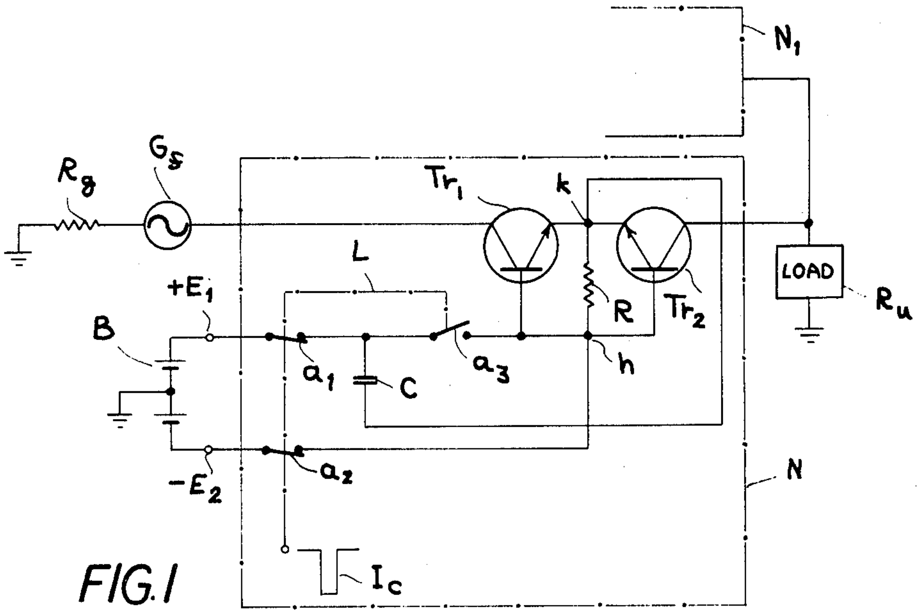

INVENTOR.
FERDINANDO FORMENTI
BY
Karl F. Ross
Attorney

GATING NETWORK FOR TIME-SHARING COMMUNICATION SYSTEM

My present invention relates to a gating circuit for temporarily closing a communication path between a signal generator and a load, e.g. as used in telephone and other message-transmitting systems operating on the principle of shared time.

In such communication systems, a series of messages to be concurrently transmitted are briefly sampled in a predetermined order of succession, this sampling being accomplished by a corresponding number of normally closed electronic gates which are momentarily opened in staggered relationship by respective command pulses applied thereto. The efficiency of this system, and the number of communication channels that can be accommodated thereby, depends upon the number of command pulses that can be generated without overlap during an operating cycle of given duration and upon the extent to which the opening and closure of each gate can be made to coincide with the leading and trailing edges of the corresponding command pulse.

The general object of my invention, therefore, is to provide a circuit arrangement ensuring a precisely timed opening and closing of an electronic gate in a communication system of this type.

A more particular object is to provide a gating network which in its closed state ensures virtually complete insulation between an associated signal generator and a load yet which forms a low-ohmic connection therebetween in its open state.

It is also an object of this invention to provide a circuit arrangement which insulates the several gates from their common power supply during an unblocking period (gate open) for the purpose of suppressing crosstalk between the different signal sources; for the same purpose of crosstalk suppression it is further desirable that the blocking condition (gate closed) be reached virtually instantaneously upon disappearance of the command pulse.

Prior systems of this general description, in which the blocking and unblocking of a talking connection was electronically performed with the aid of two- or three-electrode solid-state devices, required the insertion of a decoupling transformer between the gate circuit and the command pulse generator in order to ensure the desired mutual insulation of the lines. Such a transformer adds to the expense of the switching network and also increases its bulk, particularly when it is desired to miniaturize the various impedance elements and to mount them on a printed circuit carrier. Moreover, these transformers must be manufactured from high quality components if objectionable distortion is to be avoided.

Thus, another important object of my invention is to provide a gating circuit for the purpose set forth which avoids the need for an input transformer while maintaining the desired insulation of the conductive gate from ground and other parts of the system.

These objects are realized, pursuant to my present invention, by the provision of a normally closed electronic gate whose control circuit includes a biasing resistance adapted to open the gate in the presence of a potential difference of predetermined polarity across this resistance; to generate this potential difference, a condenser charged during the preceding blocking period or "off" cycle is discharged through the resistance during the unblocking period or "on" cycle via a normally open switch while a normally closed switch interrupts the charging circuit. The two switches controlling the charging and the discharging of the condenser are, preferably, a pair of transistors of opposite conductivity types whose bases are connected to a common input terminal receiving the command pulse; in addition, a further switching element (e.g. a half-wave rectifier) may be included in the charging circuit to complete the insulation of the gate-biasing condenser from the source of charging voltage during the "on" cycle.

According to a more specific feature of my invention, the electronic gate is constituted by a pair of transistors serially interposed between the signal source and the load in back-to-back relationship, i.e. with their bases connected in parallel to one junction and with their emitters connected in parallel to another junction on opposite sides of the biasing resistance. The baising resistance determines the time constant of both the charging and the discharging circuit of the condenser. This time constant should be relatively low for charging, in order to allow the condenser to reach the desired biasing potential as rapidly as possible, and should be relatively high on discharging, in order to maintain a substantially constant bias on the transistor bases during the unblocking interval. These two seemingly contradictory requirements can be reconciled, pursuant to a further feature of my invention, by using a resistor and a diode in series therewith as the biasing resistance, the diode being poled in the forward direction for the flow of charging current while offering a high (though not infinite) resistance in the direction of discharge.

Figure 2:
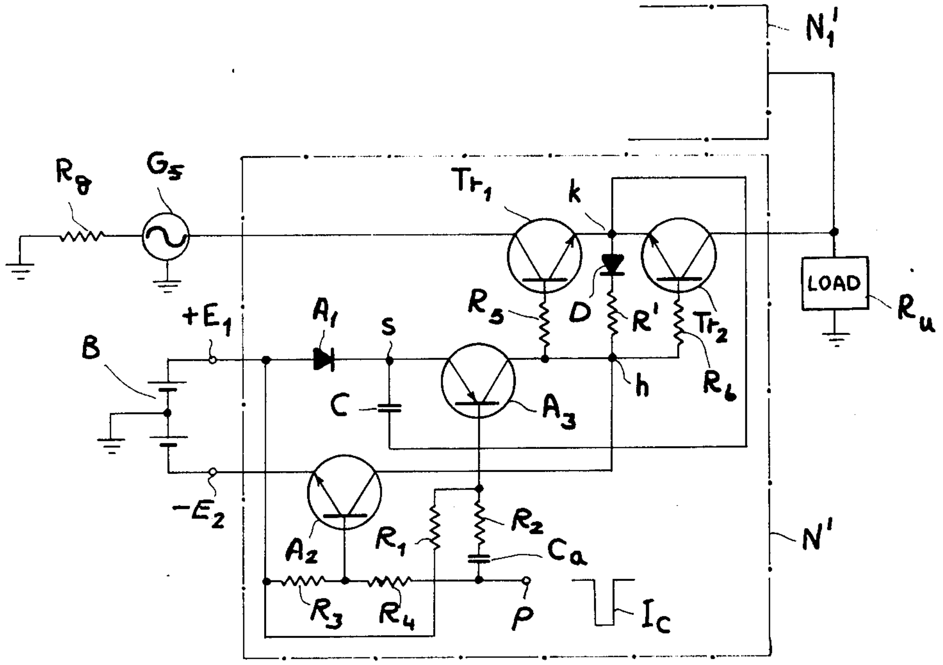

The invention will be described in greater detail with reference to the accompanying drawing in which:

FIG. 1 is a circuit diagram schematically illustrating a system according to the invention; and FIG. 2 is a more detailed circuit arrangement of a system similar to that to FIG. 1.

In FIG. 1 I show at $G_f$ a signal generator, such as a modulator producing a carrier modulated by voice frequency currents from a subscriber line, which is to be periodically connected across a load $R_u$,e.g. the input end of a transmission channel common to a multiplicity of such signal generators; another resistor $R_g$ represents the internal resistance of generator $G_g$ and other resistances in series therewith.

A gating network N in accordance with my present invention, interposed between generator $G_f$ and load $R_u$, comprises a pair of transistors $Tr_1$ and $Tr_2$, here shown to be of the NPN type, whose bases and emitters are connected in parallel across a common biasing resistance R. The common emitter terminal *k* is connected through a condenser C and a normally closed switch $a_1$ to the positive terminal $+E_1$ of a source of DC biasing voltage illustrated as a battery B with grounded center tap. The negative terminal $-E_2$ is connected through another normally closed switch $a_2$ to the common base terminal *h* of the two transistors. A normally open third switch $a_3$ lies between base terminal *h* and the plate of condenser Copposite the one connected to junction *k*.

A linkage L interconnecting the three switches $a_1$, $a_2$ and $a_3$ diagrammatically represents a switchover means for temporarily closing the switch $a_3$ while opening the switches $a_1$ and $a_2$ in response to a command pulse $I_c$ from a sampling circuit not further illustrated. The width of this command pulse, representing the duration of an unblocking interval for the gate N, may be on the order of microseconds whereas the time between pulses, representing a blocking interval, may be measured in milliseconds.

During the blocking interval, the switches $a_1$ and $a_2$ are closed while switch $a_3$ is open as illustrated in FIG. 1. Condenser C is charged to the voltage $E_1 + E_2$ of battery B through resistor R, it being understood that the time constant RC is substantially less than the duration of this blocking interval so that only a small residual charging current flows at the time of arrival of the next command pulse $I_C$. Base terminal *h* is at negative potential $-E_2$ while the potential of emitter terminal *k* is slightly more positive, owing to the flow of this residual charging current through resistor R. Thus, the polarity of the voltage drop across this resistor is such as to cut off the transistors $Tr_1$ and $Tr_2$.

Upon the occurrence of the leading edge of command pulse $I_c$, switches $a_1$ and $a_2$ are opened while switch $a_3$ is instantly closed. Condenser C now discharges through resistor R, its positive plate being connected to base terminal *h* so that the polarity of the current flow through resistor R is reversed and both transistors are immediately turned on. This effectively short circuits the transmission path through network N for alternating current flowing from generator $G_f$ to load $R_u$. The resistance of impedance R is high enough to maintain the transistors $Tr_1$ and $Tr_2$ in a state of saturation throughout the unblocking interval coinciding with the presence of pulse $I_c$.

The occurence of the trailing edge of this pulse recloses switches $a_1$ and $a_2$ while reopening the switch $a_3$. With condenser C now again connected across the voltage source B in series with resistor R, the flow of biasing current is once more reversed so that the transistors are immediately rendered nonconductive and generator $G_f$ is insulated from load $R_u$.

The system of FIG. 2 includes substantially the same elements as that of FIG. 1, yet the switches $a_1$, $a_2$ and $a_3$ have been replaced by electronic devices $A_1$, $A_2$ and $A_3$, respectively, forming part of a modified gating network N'. Device $A_1$ is a diode, device $A_2$ is an NPN transistor and device $A_3$ is a PNP transistor. A control circuit for the auxiliary transistors $A_2$ and $A_3$ includes a first resistor $R_1$ connected between the base of transistor $A_3$ and terminal $+E_1$, a second resistor $R_2$ connecting this base via an auxiliary capacitor $C_a$ to an input terminal P receiving the command pulses $I_c$, and a pair of further resistors $R_3$, $R_4$ forming a voltage divider between terminals P and $+E_1$. The junction of resistors $R_3$ and $R_4$, representing a tap of the voltage divider is connected to the base of auxiliary transistor $A_2$. Furthermore, the biasing resistance R of FIG. 1 has been replaced by a resistor R' in series with a diode D. FIG. 2 also shows base resistors $R_5$ and $R_6$ for the gating transistors $Tr_1$ and $Tr_2$. Resistors $R_1$—$R_4$ also form a discharge path for capacitor $C_a$ which, however, is charged only through resistors $R_1$ and $R_2$.

During the blocking interval, i.e. in the absence of command pulse $I_c$, input terminal P is at ground potential so that the base of transistor $A_2$ is more positive than its emitter, this transistor being therefore conductive and saturated. Charging current flows, as before, from terminal $+E_1$ through half-wave rectifier $A_1$ to one terminal *s* of condenser C and from the other terminal *k* thereof through diode D, resistor R', junction *h* and transistor $A_2$ to terminal $-E_2$. At this stage, the transistor $A_3$ is cut off, owing to a residual charge on auxiliary condenser $C_a$ which drives the base of this transistor somewhat more positive than its emitter. Upon the occurrence of command pulse $I_c$, input terminal P goes sharply negative so as to override the biasing potential of condenser C a whereby transistor $A_3$ saturates while transistor $A_2$ cuts off. The resulting flow of a discharge current from condenser C via point *s*, transistor $A_3$, junction *h*, resistor R', diode D (in the reverse direction thereof) and terminal *k* biases the gating transistors $Tr_1$ and $Tr_2$ to saturation so that, as before, signal generator $G_f$ is effectively connected across the load $R_u$. Since the output of generator $G_f$ is balanced with reference to ground, the average potential of condenser terminal *k* is zero while that of point *s* has a positive value substantially equal to the charging voltage $E_1 + E_2$ of condenser C, owing to the small decay of this voltage during the short unblocking interval. Diode $A_1$ is therefore biased in the reverse direction and effectively disconnects the condenser C from voltage source B as long as the signal amplitudes in the output of generator $G_f$ are less than this biasing voltage.

It will thus be seen that I have provided a circuit arrangement wherein a pair of gating transistors $Tr_1$, $Tr_2$ are floatingly biased to saturation during an unblocking interval, their source of biasing voltage being a condenser which at that instant is effectively decoupled from the remainder of the circuit without intervention of an input transformer. This fact, along with the sharply timed opening and closure of the gate, eliminates crosstalk between the subscriber represented by signal generator Gf and other subscribers subsequently connectable to the same load $R_u$ through other gating networks $N_1$ or $N_1'$. Naturally, the same kind of arrangement may be used for the gating of interleaved message signals from an incoming channel to a multiplicity of receiving subscriber lines.

The three switches $a_1$, $a_2$ and $a_3$ of FIG. 1 are, of course, representative of a variety of electronic devices including, but not limited to, transistors such as those shown at $A_2$ and $A_3$ in FIG. 2. Thus, the disclosed system may be modified in various ways without departing from the spirit and scope of my invention as defined in the appended claims.

I claim:

1. A circuit arrangement for temporarily closing a connection between a signal generator and a load, comprising:
normally closed electronic gate means in series with said generator and said load, said gate means having input electrodes and being provided with a control circuit including a biasing resistance directly connected across said input electrodes for opening said gate means in the presence of a potential difference of predetermined polarity across said resistance;
a condenser;
a source of charging voltage for said condenser;
a charging circuit connecting said source across said condenser and including normally closed first controllable switch means in series with said resistance;
a discharging circuit connecting said condenser across said resistance and including normally open second controllable switch means, said condenser bridging said input electrodes in parallel with said resistance upon closure of said second switch means; and
switchover means for temporarily opening said first switch means with concurrent closure of said second switch means, thereby discharging said condenser through said resistance for developing said potential difference thereacross.

2. A circuit arrangement as defined in claim 1 wherein said electronic gate means comprises a pair of transistors serially connected in back-to-back relationship, said transistors having respective bases interconnected at a first junction and respective emitters interconnected at a second junction, said resistance being inserted between said junctions.

3. A circuit arrangement as defined in claim 2 wherein said resistance includes a resistor and a diode in series, said diode being poled in the direction of current flow upon closure of said first switch means.

4. A circuit arrangement as defined in claim 2 wherein said first switch means comprises a first auxiliary transistor and said second switch means comprises a second auxiliary transistor.

5. A circuit arrangement as defined in claim 4 wherein said auxiliary transistors are of opposite conductivity types and are provided with respective bases connected to a common input terminal, said switchover means including a source of command pulses connected to said terminal.

6. A circuit arrangement as defined in claim 5 wherein said source of charging voltage comprises a pair of voltage terminals, said first auxiliary transistor being connected between one of said voltage terminals and one of said junctions, said first switch means including a further switching element connected between the other of said voltage terminals and said one of said junctions in series with said second auxiliary transistor, said condenser being connected between the other of said junctions and a common terminal of said second auxiliary transistor and said further switching element.

7. A circuit arrangement as defined in claim 6 wherein said further switching element is a half-wave rectifier poled in the forward direction of said second auxiliary transistor.

8. A circuit arrangement as defined in claim 6 wherein said voltage terminals are connected to potentials respectively more positive and more negative than the potential of said input terminal in the absence of said command pulse.

9. A circuit arrangement as defined in claim 8, further comprising a voltage divider connected between said input terminal and said other of said voltage terminals, said first auxiliary transistor having its base connected to a tap on said voltage divider.

10. A circuit arrangement as defined in claim 9, further comprising a capacitance inserted between said input terminal and the base of said second auxiliary transistor, said capacitance being provided with a discharge path including said voltage divider.